(12) United States Patent
Yamashiro et al.

(10) Patent No.: US 10,082,075 B2
(45) Date of Patent: Sep. 25, 2018

(54) OIL FILTER LAYOUT STRUCTURE FOR INTERNAL COMBUSTION ENGINE FOR MOTORCYCLE

(71) Applicant: HONDA MOTOR CO., LTD., Tokyo (JP)

(72) Inventors: Hayato Yamashiro, Wako (JP); Hidetoshi Wakasa, Wako (JP); Takuya Miyamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 375 days.

(21) Appl. No.: 13/949,602

(22) Filed: Jul. 24, 2013

(65) Prior Publication Data

US 2014/0026844 A1 Jan. 30, 2014

(30) Foreign Application Priority Data

Jul. 27, 2012 (JP) .................................. 2012-167257

(51) Int. Cl.
*F02B 61/04* (2006.01)
*F02B 77/00* (2006.01)
*B62K 11/04* (2006.01)
*F01N 13/10* (2010.01)
*F02B 61/02* (2006.01)
(Continued)

(52) U.S. Cl.
CPC .............. *F02B 77/00* (2013.01); *B62K 11/04* (2013.01); *F01M 1/10* (2013.01); *F01M 11/0004* (2013.01); *F01N 13/10* (2013.01); *F02B 61/02* (2013.01); *F01N 2340/02* (2013.01); *F01N 2590/04* (2013.01)

(58) Field of Classification Search
CPC .......... F02B 67/06; F02B 75/22; F02B 77/00; F01M 11/03; F01M 2011/035; F01M 1/10; F01M 2001/105; F01M 2001/1071; F01M 11/0004; F01N 13/10; F01N 2340/02
USPC ............................... 123/198 R, 195 C, 195 R
See application file for complete search history.

(56) References Cited

U.S. PATENT DOCUMENTS 4,920,825 A * 5/1990 Okazaki ................ F02F 7/0046
                                                  123/195 C
5,718,196 A * 2/1998 Uchiyama ............... F01L 1/265
                                                  123/195 C
(Continued)

FOREIGN PATENT DOCUMENTS

JP          3038661 B2    3/2000

*Primary Examiner* — Lindsay Low
*Assistant Examiner* — Omar Morales
(74) *Attorney, Agent, or Firm* — Squire Patton Boggs (US) LLP

(57) ABSTRACT

An oil filter layout structure for an internal combustion engine for a motorcycle. An exhaust pipe connected to an exhaust port extends rearwardly beneath the internal combustion engine along a longitudinal direction of the motorcycle. An oil pan is disposed below the internal combustion engine, the oil pan having one of left and right side walls spaced along a transverse direction of the motorcycle. The one side wall is inclined downwardly toward a center of the motorcycle. The exhaust pipe is disposed closely to the side wall. An oil filter is mounted on the internal combustion engine and disposed below the internal combustion engine in overlapping relation to the oil pan as viewed in side elevation, near the other of the left and right side walls of the oil pan.

20 Claims, 9 Drawing Sheets

(51) Int. Cl.
*F01M 1/10* (2006.01)
*F01M 11/00* (2006.01)

(56) References Cited

U.S. PATENT DOCUMENTS

| | | | | |
|---|---|---|---|---|
| 6,305,337 | B1* | 10/2001 | Sumi | F01L 1/02 |
| | | | | 123/179.25 |
| 2006/0065218 | A1* | 3/2006 | Gokan | F01M 5/007 |
| | | | | 123/41.82 R |
| 2010/0192900 | A1* | 8/2010 | Ohmori et al. | 123/198 DA |

* cited by examiner

OIL FILTER LAYOUT STRUCTURE FOR INTERNAL COMBUSTION ENGINE FOR MOTORCYCLE

BACKGROUND

Field

The present invention relates to a layout structure for an oil filter in an internal combustion engine for a motorcycle.

Description of the Related Art

There is known a motorcycle wherein the exhaust pipe connected to the exhaust port of a mounted internal combustion engine extends rearwardly beneath the internal combustion engine along a longitudinal direction of the motorcycle. In such a motorcycle, a cartridge-type oil filter is disposed on one of left and right side walls, spaced along a transverse direction of the vehicle, of an oil pan that is disposed rearwardly and downwardly of the internal combustion engine, as disclosed in Patent Document 1 (Japanese Patent No. 3038661), for example.

According to Patent Document 1, the oil filter is disposed in a cavity defined in the side wall of a rear portion of the oil pan, so that the oil filter does not project along the transverse direction of the vehicle.

However, since the cavity in the oil pan tends to reduce the amount of oil that can be stored in the oil pan, it is necessary to lower the bottom of the oil pan to provide the oil panel with a desired storage capacity. The oil pan thus constructed has a reduced height from the ground, which tends not only to adversely affect the ability of the motorcycle to run over steps and also the bank angle, but also to cause the oil pan to interfere with an exhaust pipe which extends below the oil pan in a rearward direction of the internal combustion engine.

SUMMARY

In view of the related art disclosed in Patent Document 1 referred to above, it is an object of the present invention to provide an oil filter layout structure for an internal combustion engine for motorcycles, which allows an oil filter and an exhaust pipe to be disposed below an internal combustion engine and also allows an oil pan to have a desired oil storage capacity, while preventing the oil pan and the exhaust pipe from interfering with the oil filter.

To achieve the above object, there is provided in accordance with an embodiment of the invention an oil filter layout structure for an internal combustion engine for a motorcycle wherein an exhaust pipe connected to an exhaust port of the internal combustion engine for the motorcycle extends rearwardly beneath the internal combustion engine along a longitudinal direction of the motorcycle. An oil pan is disposed below the internal combustion engine, the oil pan having one of left and right side walls spaced along a transverse direction of the motorcycle. The side wall is inclined downwardly toward the transverse center of the motorcycle, and the exhaust pipe is disposed closely to the side wall. An oil filter is removably mounted on the internal combustion engine and disposed below the internal combustion engine in overlapping relation to the oil pan as viewed in side elevation, near the other of the left and right side walls of the oil pan, spaced along the transverse direction of the motorcycle.

According to another embodiment of the invention, the oil pan has a recess defined in a portion of the other side wall at a lower surface of a lower crankcase, the recess being recessed toward the transverse center of the motorcycle. The oil filter is housed in the recess and mounted on a bottom surface of the crankcase.

According to another embodiment of the invention, left and right side covers are configured to cover the internal combustion engine. The oil filter is disposed for vertical installation and removal through a gap between lower ends of the left and right lower side covers.

According to another embodiment of the invention, the oil pan has a bottom positioned below a lower end of the oil filter.

According to another embodiment of the invention, the oil pan has a drain hole defined in the other side wall which defines the recess therein, and disposed below the oil filter.

According to another embodiment of the invention, the side walls of the oil pan which is disposed forwardly of the oil filter has slanted regions, respectively, which are inclined upwardly to the left and the right from the bottom of the oil pan. The slanted region of the one side wall is inclined at a smaller angle than the other side wall.

According to another embodiment of the invention, the crankcase has a lower oil filter mounting surface lying flush with an oil pan mounting surface of the crankcase.

According to another embodiment of the invention, the oil filter is disposed such that the oil filter has a front surface covered with the oil pan as the internal combustion engine is viewed in front elevation.

With the oil filter layout structure for the internal combustion engine for the motorcycle according to an embodiment of the invention, since the exhaust pipe and the oil filter are disposed respectively near the side walls of the oil pan and are separate from each other in sandwiching relation to the oil pan, the oil pan has its bottom positioned deeply downwardly out of interference with the exhaust pipe and the oil filter at a central position on the internal combustion engine between the exhaust pipe and the oil filter. Therefore, the exhaust pipe and other parts maintain a desired height from the ground while at the same time the oil pan has a desired oil storage capacity, thereby preventing the motorcycle from reducing its ability to run over steps and also reducing its bank angle.

According to other embodiments of the invention, as the oil filter is housed in the recess of the oil pan and mounted on the bottom surface of the crankcase, the oil filter has a greater height from the ground than if the oil filter is mounted on the bottom of the oil pan.

According to other embodiments of the invention, with the motorcycle wherein the left and right sides of the internal combustion engine are covered with the side covers, the oil filter is laterally covered with the side covers, and hence remains unexposed, improving the appearance of the motorcycle. The oil filter can be installed and removed through the gap between the lower part of the side covers. Since the oil filter can be replaced without the need for dislodging the side covers, the oil filter has better maintainability.

According to other embodiments of the invention, when the oil filter is replaced, the oil pan serves as a partition wall which prevents a tool or the like used to replace the oil filter from interfering with the exhaust pipe.

According to other embodiments of the invention, the drain hole is defined in the other side wall which defines the recess of the oil pan, and is disposed below the oil filter. Therefore, when oil is drained from the drain hole, the oil does not splash over the oil filter and hence does not smear the oil filter.

According to embodiments of the invention, the slanted region of the one side wall near the exhaust pipe is inclined at a smaller angle than the other side wall. Consequently, an increased transverse space is provided below the oil pan for the installation of the exhaust pipe therein to allow the motorcycle to have a desired bank angle.

According to embodiments of the invention, inasmuch as the oil pan mounting surface and the oil filter mounting surface lie flush with each other at the bottom of the crankcase, the mounting surfaces can be machined in one machining process. Therefore, the number of machining man-hours can be reduced.

According to embodiments of the invention, since the front surface of the oil filter is covered with the oil pan, the oil filter is protected against hurtling pebbles or the like from the front.

DETAILED DESCRIPTION

Figure 1:
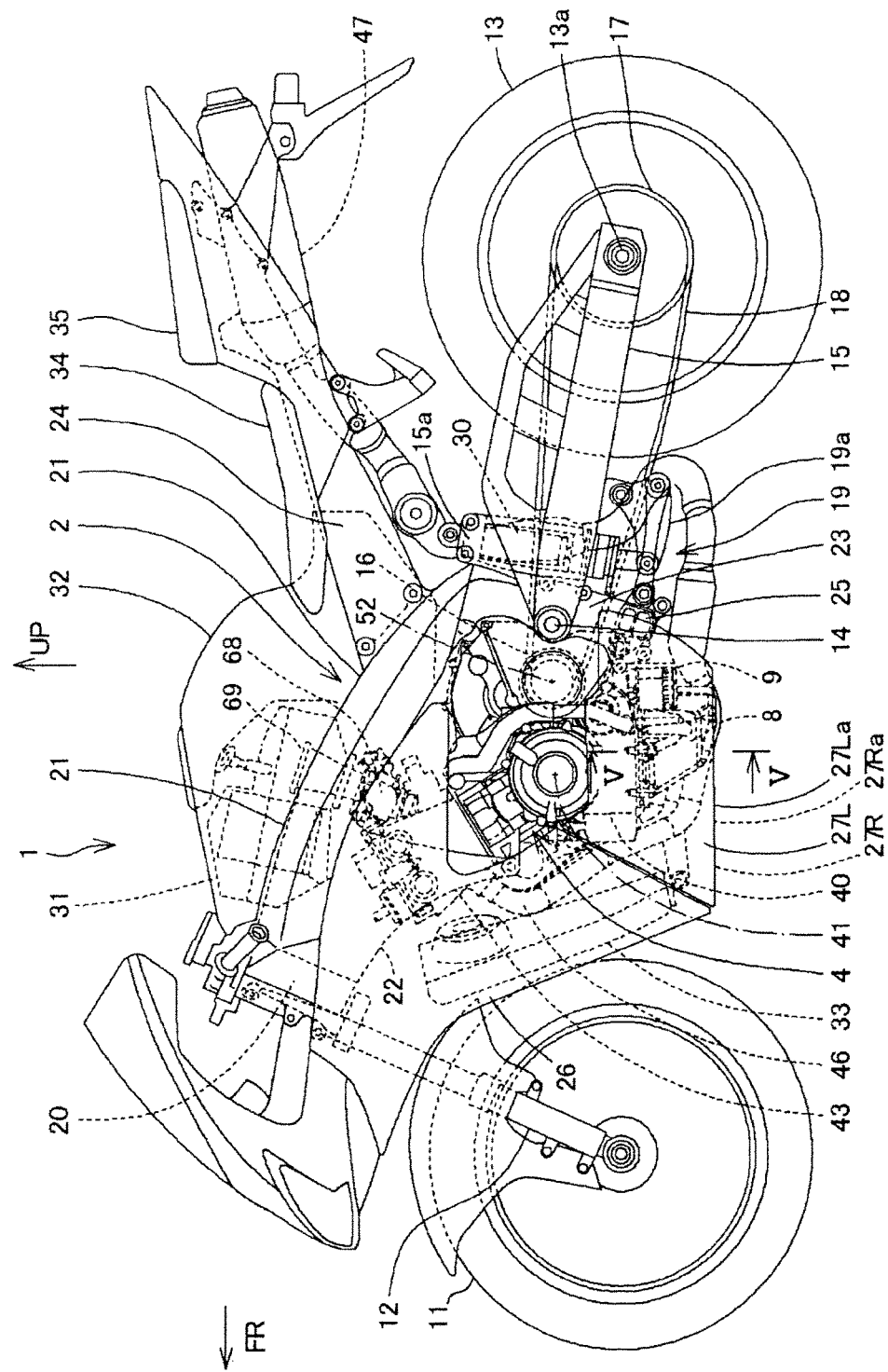
FIG. 1 is a left-hand side elevational view of a motorcycle which incorporates an internal combustion engine for a motorcycle having an oil filter layout structure according to embodiments of the present invention.

An oil filter layout structure for an internal combustion engine for a motorcycle according to an embodiment of the present invention will be described below with reference to FIGS. 1 through 9.

Directions such as forward, rearward, leftward, rightward, upward, and downward directions referred to in the description and scope of claims shall be used in accordance with the directions of a vehicle (motorcycle) incorporating an internal combustion engine for a motorcycle (hereinafter referred to as "internal combustion engine" for simplicity) according to the embodiment. In the drawings, the arrow FR represent the forward direction of the vehicle, the arrow LH the leftward direction of the vehicle, the arrow RH the rightward direction of the vehicle, and the arrow UP the upward direction of the vehicle.

As shown in FIG. 1, a motorcycle 1 according to an embodiment of the present invention has a body frame 2 including a head pipe 20 on which a front fork 12 with a front wheel 11 rotatably supported thereon is steerably supported, a pair of left and right main frames 21 extending rearwardly and downwardly from the head pipe 20, a pair of left and right engine hangers 22 joined to the head pipe 20 and front portions of the left and right main frames 21 and extending rearwardly and downwardly below the main frames 21, a pair of left and right pivot frames 23 joined to rear end portions of the main frames 21 and extending downwardly, and a pair of left and right seat rails 24 extending rearwardly and upwardly and coupled to rear portions of the main frames 21.

An internal combustion engine 4 is mounted on the body frame 2 at a position below the main frames 21. A rear wheel 13 which is rotated by power output from the internal combustion engine 4 has an axle 13a rotatably supported on the rear end of a swing arm 15 whose front end portion is vertically swingably supported on the pivot frames 23 by a support shaft 14.

The internal combustion engine 4 has an output shaft 52 with a drive sprocket 16 fixed thereto. An endless chain 18 is trained around the drive sprocket 16 and a driven sprocket 17 that is fixed to the axle 13a.

A link mechanism 19 is disposed between a cross pipe 25 that interconnects lower portions of the left and right pivot frames 23 and the swing arm 15. A rear cushion unit 30 is disposed between a link member 19a which composes a part of the link mechanism 19 and a bracket 15a which is disposed on a front portion of the swing arm 15.

The internal combustion engine 4 is disposed below an air cleaner 31 which is positioned rearwardly of the head pipe 20 of the body frame 2. The air cleaner 31 has its rear and upper portions covered by a fuel tank 32 that is placed on the main frames 21 of the body frame 2.

The internal combustion engine 4 is disposed rearwardly of a radiator 33.

A main seat 34 for the rider to sit thereon is supported on the seat rails 24 behind the fuel tank 32, and a pillion seat 35 for a pillion to sit thereon is supported on the seat rails 24 behind the main seat 34.

The vehicle body is covered with a main cover 26 extending from the head pipe 20 to a front side portion of the internal combustion engine 4, a left lower side cover (left side cover of the present invention) 27L extending from the main cover 26 to a left lower portion of the internal combustion engine 4, and a right lower side cover (right side cover of the present invention) 27R extending from the main cover 26 to a right lower portion of the internal combustion engine 4.

The main cover 26 has a forward central portion open to stay clear of a rear portion of the front wheel 11 and to deliver rum air to the radiator 33 and the internal combustion engine 4.

The left lower side cover 27L and the right lower side cover 27R have respective lower ends 27La, 27Ra that are spaced from each other in the transverse direction of the motorcycle to allow ram air to pass therebetween and also to provide access therebetween to the lower part of the internal combustion engine 4.

Figure 2:
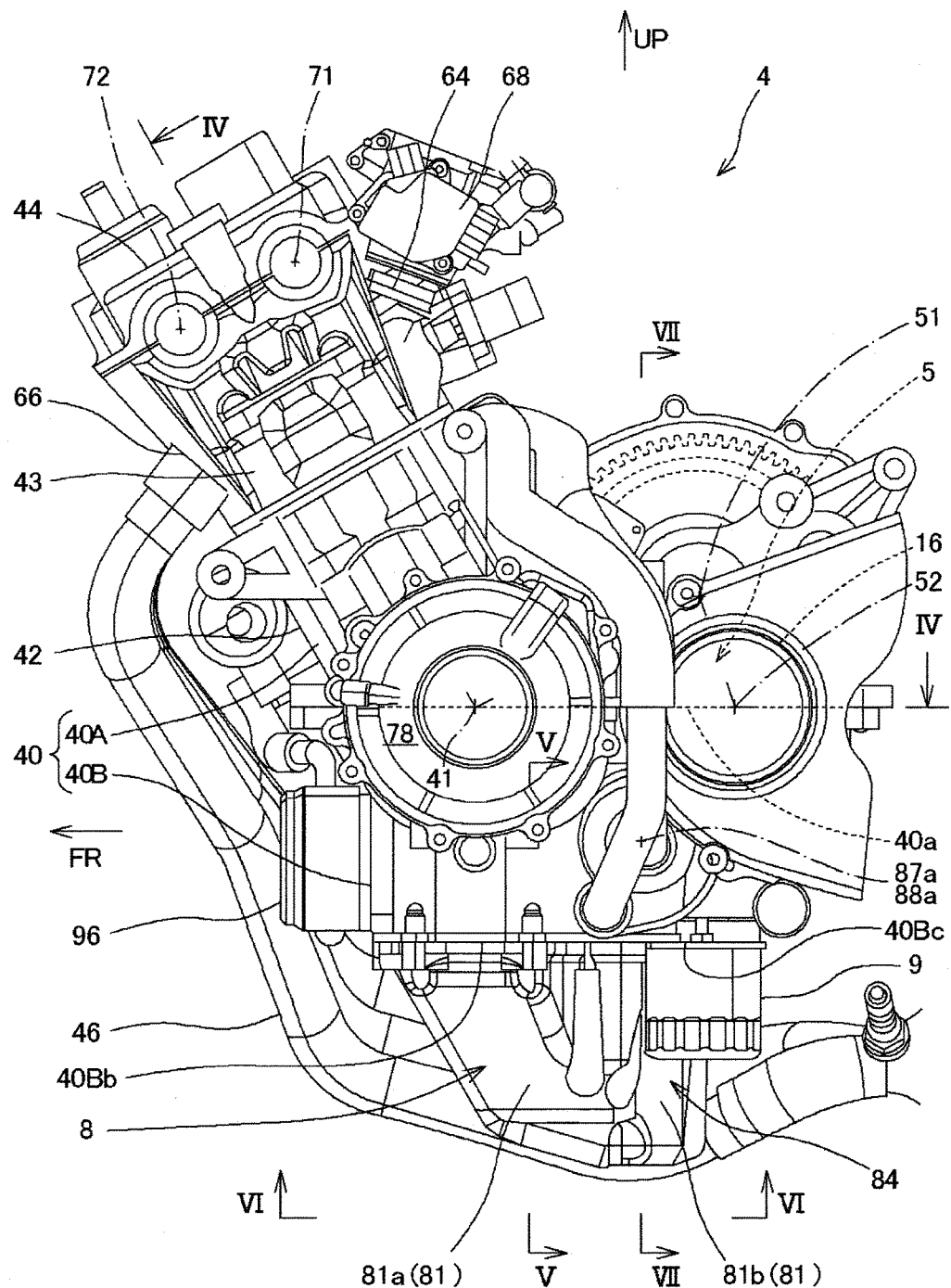
FIG. 2 is a left-hand side elevational view of the internal combustion engine for the motorcycle having the oil filter layout structure according to embodiments of the present invention.
Figure 3:
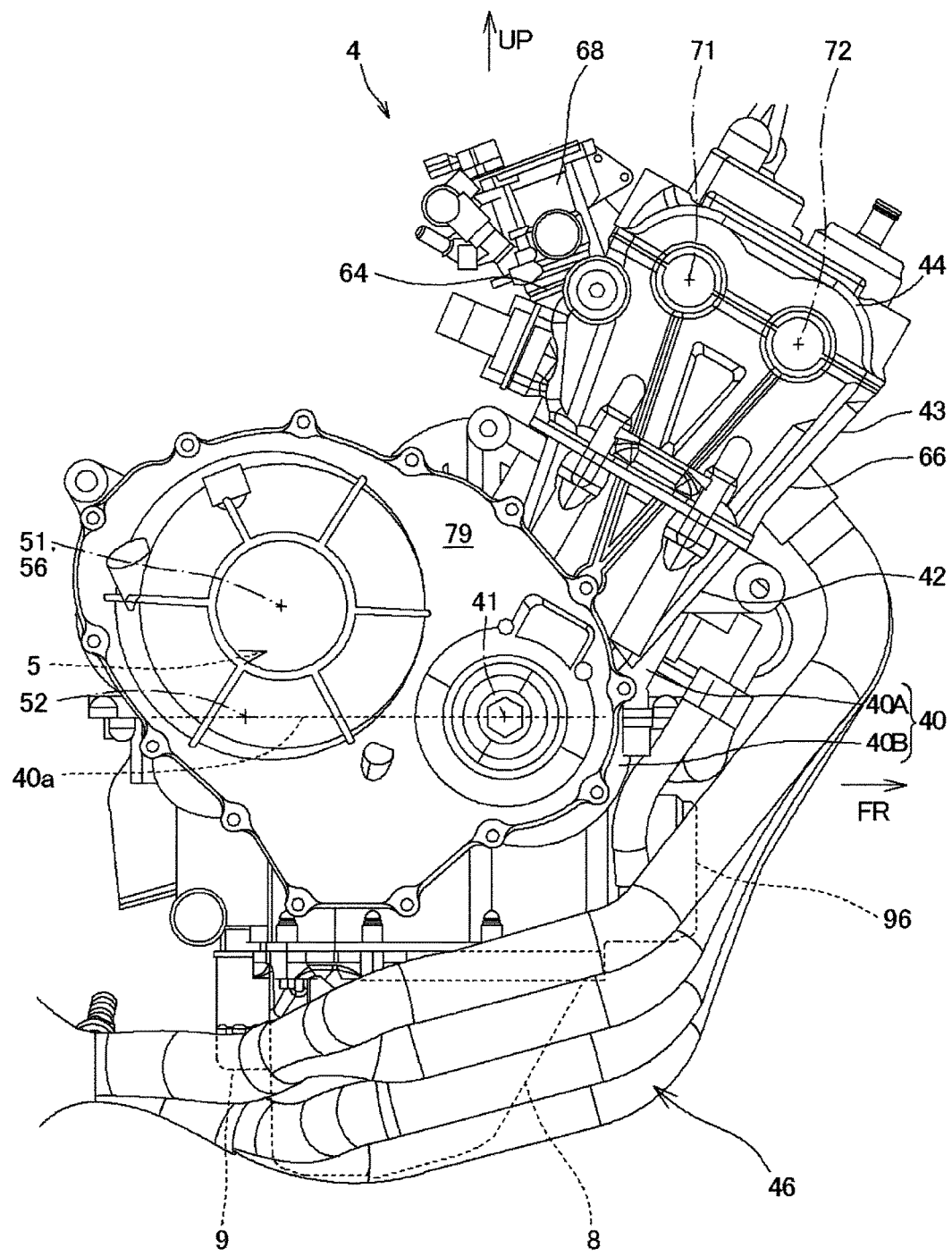
FIG. 3 is a right-hand side elevational view of the internal combustion engine for the motorcycle shown in FIG. 2.

As shown in FIGS. 2 and 3, the internal combustion engine 4 has a crankcase 40 with a transmission 5 housed therein. The internal combustion engine 4 and the transmission 5 jointly make up a power unit.

The crankcase 40 is configured to be separated into upper side and lower side, and is made up of an upper crankcase 40A and a lower crankcase 40B by which there is rotatably supported a crankshaft 41 that extends horizontally in the transverse direction of the motorcycle. The crankcase 40 is supported on the main frame 21 and the engine hangers 22.

The internal combustion engine 4 is a water-cooled four-stroke cycle in-line four-cylinder internal combustion engine. The internal combustion engine 4 includes a cylinder block 42 integrally joined to a front upper portion of the upper crankcase 40A and tilted slightly forwardly. The internal combustion engine 4 also includes a cylinder head 43 and a cylinder head cover successively mounted on and fastened to the cylinder block 42. An oil pan 8 is mounted on a lower portion of the lower crankcase 40B.

Figure 4:
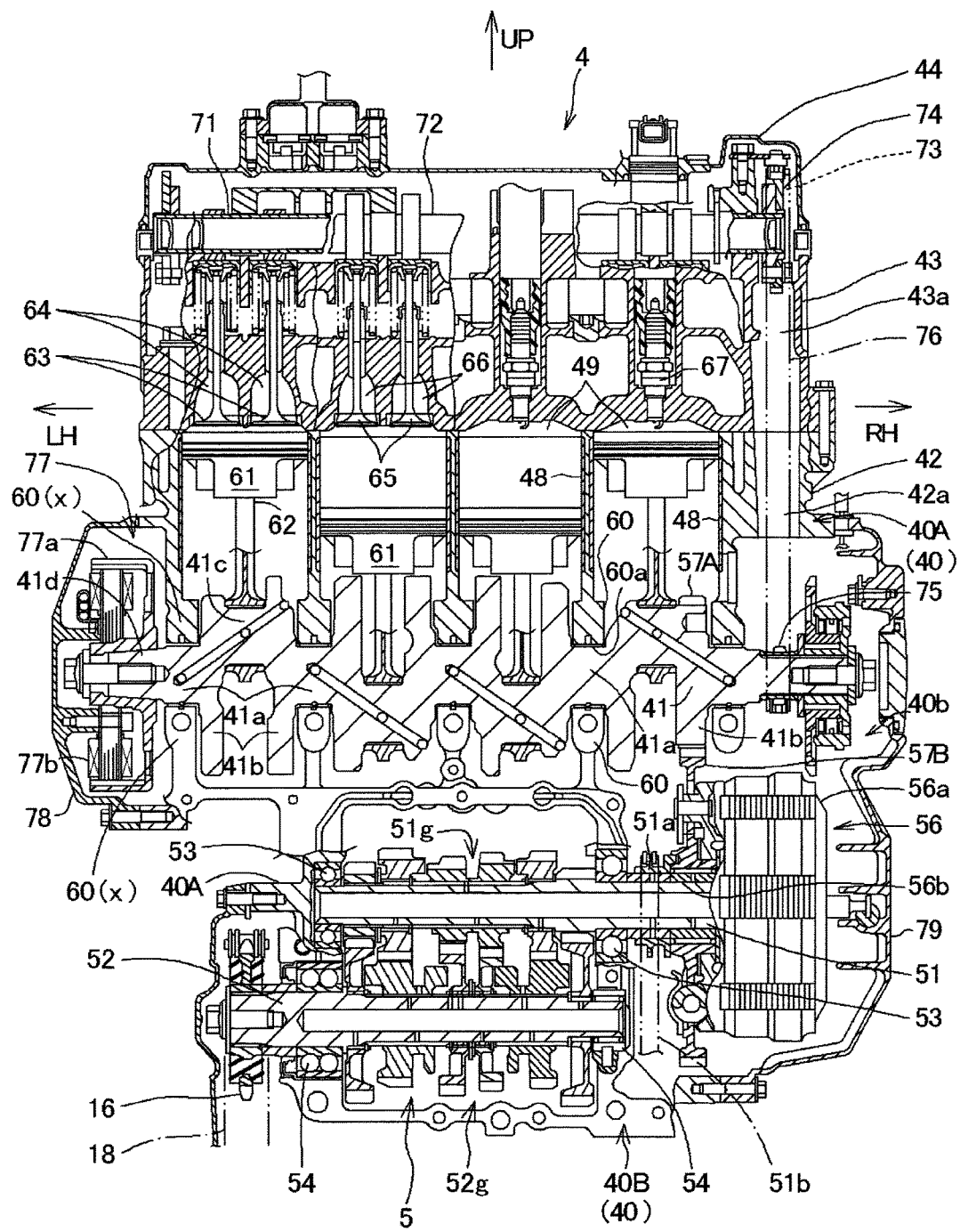
FIG. 4 is an unfolded cross-sectional view of the internal combustion engine for a motorcycle, taken along line IV-IV of FIG. 2.

The crankshaft 41 which is supported on the crankcase 40 is held in engagement with the transmission 5 that is housed in the crankcase 40 (see FIG. 4).

As shown in FIG. 1, an exhaust pipe 46 is connected to a front portion of the cylinder head 43 of the internal combustion engine 4. The exhaust pipe 46 extends from the front portion of the internal combustion engine 4 and below the internal combustion engine 4, and is connected to an exhaust muffler 47.

According to the present embodiment, an oil filter 9 is disposed below the internal combustion engine 4 in overlapping relation to the oil pan 8 as viewed in side elevation.

As shown in FIG. 4, the transmission 5, which is housed in a rear portion of the crankcase 40, includes a main shaft 51 and a countershaft 52 that lie parallel to the crankshaft 41. The countershaft 52 serves as an output shaft 52 of the internal combustion engine 4 and has a left end portion projecting out of the crankcase 40, with the drive sprocket 16 being mounted on the projecting left end portion of the countershaft 52.

The upper crankcase 40A and the lower crankcase 40B have respective journal walls 60 vertically sandwiching journals 41a of the crankshaft 41 with main bearings 60 interposed therebetween, so that the crankshaft 41 is rotatably supported by the journal walls 60.

Since the internal combustion engine 4 has four integral cylinders arrayed in line with respective four cylinder bores 48 defined therein, the crankshaft 41 has five journals 41a, and the crankshaft 41 is rotatably supported by five upper journal walls 60 of the upper crankcase 40A and five lower journal walls 60 of the lower crankcase 40B.

The upper crankcase 40A and the lower crankcase 40B are integrally fastened to each other by bolts with their respective parting faces 40a (see FIGS. 2 and 3) mating with each other.

The crankshaft 41 includes integral crankpins 41c each disposed between adjacent ones of the journals 41a and sandwiched between left and right webs 41b.

Pistons 61 is telescopically fitted in the respective four cylinder bores 48 in the cylinder block 42 that is integral with the upper crankcase 40A. The pistons 61 are coupled to the respective crankpins 41c of the crankshaft 41 by connecting rods 62.

The cylinder head 43 has combustion chambers 49 defined therein in association with the respective cylinder bores 48 and facing the pistons 61, respectively, intake ports 64 which are open into the combustion chambers 49 and extending rearwardly, each of the intake ports 64 being openable and closable by a pair of intake valves 63, exhaust ports 66 which are open into the combustion chambers 49 and extending forwardly, each of the exhaust ports 66 being openable and closable by a pair of exhaust valves 65, and ignition plugs 67 disposed in the respective combustion chambers 49.

A throttle body 68 is connected to upstream openings of the intake ports 64, and an intake pipe 69 is connected to an upstream end of the throttle body 68. The air cleaner 31 is connected to the intake pipe 69. The exhaust pipe 46 is connected to downstream openings of the exhaust ports 66 (see FIG. 1).

As shown in FIG. 4, the intake valves 63 and the exhaust valves 65 are opened and closed in synchronism with rotation of the crankshaft 41 by an intake camshaft 71 and an exhaust camshaft 72 which are rotatably supported in the cylinder head 43.

The camshafts 71 and 72 have right-hand ends over which respective cam sprockets 73 and 74 are fitted. A timing chain 76 is trained around the cam sprockets 73 and 74 and a cam drive sprocket 75 which is fitted over the crankshaft 41 near its right end. The camshafts 71 and 72 are rotated at a speed which is one-half of the speed of the crankshaft 41 by the crankshaft 41 through the timing chain 76. The timing chain 76 is housed in cam chain chambers 42a and 43a that are defined in right end portions of the cylinder block 42 and the cylinder head 43.

The crankshaft 41 has a left end portion 41d projecting leftwardly from the leftmost journal wall 60($x$) which serves as a left side wall of the crankcase 40. An AC generator 77 includes an outer rotor 77a fitted over the projecting left end portion 41d. The AC generator 77 is covered with a generator cover 78, which serves as a left crankcase cover, placed over the AC generator 77 on its left side. The AC generator 77 includes an inner stator 77b having generating coils and disposed in the outer rotor 77a.

The transmission 5 is disposed behind the crankshaft 41 in the crankcase 40.

The transmission 5 is a normally meshing gear transmission. The main shaft 51 is rotatably supported in the upper crankcase 40A by bearings 53 behind the crankshaft 41 and obliquely upwardly of the crankshaft 41. The countershaft 52 is rotatably supported in the upper crankcase 40A and the lower crankcase 40B between parting faces 40a by bearings 54 behind the crankshaft 41 (see also FIGS. 2 and 3).

Transmission gear groups 51g and 52g are mounted respectively on the main shaft 51 and the countershaft 52 which lie parallel to the crankshaft 41. The transmission gear groups 51g and 52g have intermeshing gears which are splined to the main shaft 51 and the countershaft 52. The intermeshing gears can be axially shifted by a transmission actuating mechanism, not shown, as a gear shifter for placing the transmission 5 into different gear positions as desired.

A multi-disk clutch 56 is mounted on the right end of the main shaft 51 and has a clutch outer assembly 56a with a primary driven gear 57B supported thereon for corotation. A primary drive gear 57A is disposed on the rightmost crank web 41b of the crankshaft 51 and held in mesh with the primary driven gear 57B, jointly making up a primary speed reducer mechanism.

The clutch 56 also has a clutch inner assembly 56b on its output side which is splined to the main shaft 51. Therefore, when the crankshaft 41 is rotated, its rotation is transmitted through the primary speed reducer mechanism 57A and 57B and the clutch 56 to the main shaft 51 of the transmission 5.

Rotational power from the crankshaft 41 is transmitted to the clutch 56 through the primary drive gear 57A on the crankshaft 41 and the primary driven gear 57B on the clutch 56. While the transmission 5 is shifting its gears, the clutch 56 cuts off the rotational power from the crankshaft 41, but does not transmit the rotational power to the transmission 5. When the transmission 5 has finished shifting its gears, the clutch 56 starts to transmit the rotational power from the crankshaft 41 to the transmission 5.

The rotation of the main shaft 51 is transmitted through the transmission gear groups 51g and 52g to the countershaft 52.

The countershaft 52, which serves as the output shaft 52 of the internal combustion engine 4, has its left end portion projecting out of the crankcase 40 through its left side wall. The drive sprocket 16 mounted on the projecting left end portion of the countershaft 52, the driven sprocket 17 of the rear wheel 13, and the endless chain 18 trained around the drive sprocket 16 and the driven sprocket 17 jointly make up a secondary speed reducer mechanism. The rotational power from the output shaft 52 of the internal combustion engine 4 is transmitted through the secondary speed reducer mechanism to the rear wheel 13 (see FIG. 1).

The upper and lower crankcases 40A and 40B have a large opening 40b defined therein at the right end of the crankshaft 41 and the right side of the clutch 56 on the right end of the main shaft 51. The large opening 40b is closed by a right crankcase cover 79 that is fastened to the upper and lower crankcases 40A and 40B on their right sides.

Figure 5:
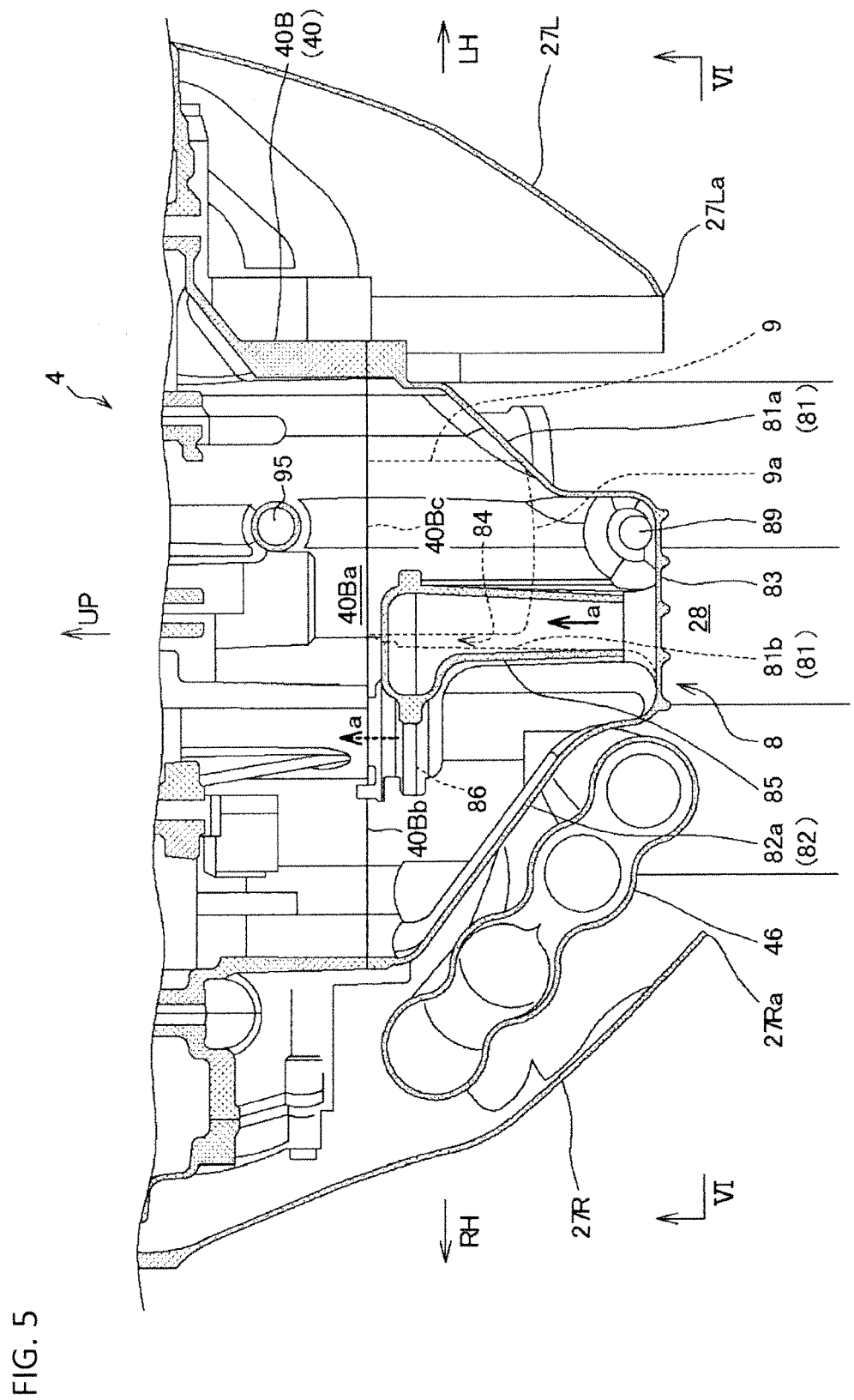
FIG. 5 is a sectional front elevational view of the internal combustion engine for the motorcycle, taken along line V-V of FIGS. 1 and 2.

As shown in FIG. 5, the lower crankcase 40B has an opening 40Ba defined in its bottom which is open downwardly and is held in fluid communication with the oil pan 8. The oil pan 8, which is fastened to the bottom of the lower crankcase 40B, has a left side wall (other side wall) 81 facing the left in the transverse direction of the vehicle and a right side wall (one side wall) 82 facing the right in the transverse direction of the vehicle. The left side wall 81 and the right side wall 82 are inclined downwardly toward the center of the vehicle. In other words, the oil pan 8 has a left side wall slanted region (slanted region) 81a and a right side wall slanted region (slanted region) 82a which are inclined so as to spread upwardly to the left and right from a bottom 83 of the oil pan 8.

The right side wall slanted region 82a is inclined at a smaller angle than the left side wall slanted region 81a, and has a greater transverse width than the left side wall slanted region 81a. The exhaust pipe 46 which is connected to the exhaust ports 66 in the cylinder head 43 is disposed closely to the right side wall slanted region 82a, and extends beneath the internal combustion engine 4 along the rearward direction of the vehicle (see FIG. 3).

Therefore, there is a sufficient space available beneath the internal combustion engine 4 for placing the exhaust pipe 46 therein, which is thus prevented from protruding downwardly beneath the internal combustion engine 4.

Figure 6:
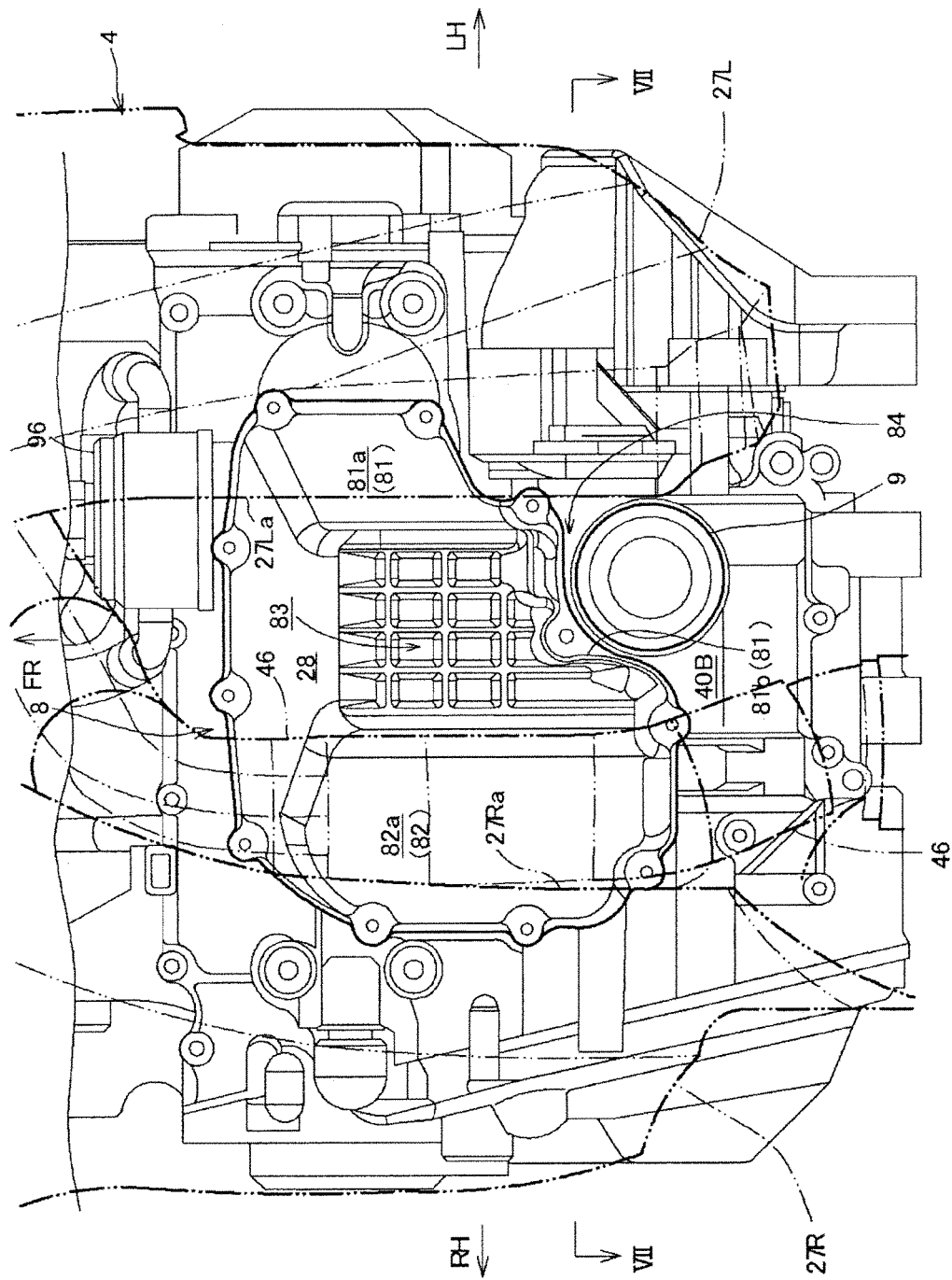
FIG. 6 is a bottom view of the internal combustion engine for the motorcycle, taken along line VI-VI of FIG. 2.

As shown in FIG. 6, which illustrates the bottom surface of the internal combustion engine 4, the left side wall 81 (shown on the right side) of the oil pan 8 has a recess 84 defined therein behind the left side wall slanted region 81a and extending toward the transverse center of the vehicle. The recess 84 is defined by a left side wall recess region 81b which extends substantially vertically. The oil filter 9 is surrounded by and positioned in the left side wall recess region 81b, and removably mounted on the bottom of the lower crankcase 40B of the crankcase 40.

According to the present embodiment, as shown in FIGS. 5 and 6, the internal combustion engine 4 has left and right lower portions covered respective with a left lower side cover 27L and a right lower side cover 27R. The left lower side cover 27L and the right lower side cover 27R have respective lower ends 27La and 27Ra that are spaced from each other in the widthwise direction of the vehicle. As the oil filter 9 is laterally covered with the left lower side cover 27L and the right lower side cover 27R, the oil filter 9 is not exposed to view, thereby improving the appearance of the motorcycle 1. Since the oil filter 9 can easily be accessed from below through a gap (gap) 28 between the lower ends 27La and 27Ra, the oil filter 9 can easily be installed, removed, or otherwise serviced for maintenance.

As shown in FIG. 5, the lower crankcase 40B has an oil filter mounting surface 40Bc that lies flush with an oil pan mounting surface 40Bb of the lower crankcase 40B. The oil filter 9 which is positioned in the recess 84 of the oil pan 8 is covered with and located behind the oil pan 8 as the internal combustion engine 4 is viewed from the front.

When the internal combustion engine 4 is viewed in side elevation, the oil filter 9 is positioned in overlapping relation to the oil pan 8 (see FIGS. 2 and 3). Therefore, the oil filter 9 does not protrude downwardly. This, together with the fact that the exhaust pipe 46 is disposed closely to the right side wall slanted region 82a, the oil filter 9 maintains its height from the ground, preventing the motorcycle 1 from reducing its ability to run over steps and also reducing its bank angle.

As the exhaust pipe 46 and the oil filter 9 are disposed separately from each other on the left and right sides of the oil pan 8, the exhaust pipe 46 and the oil filter 9 maintain their height from the ground, and at the same time the bottom 83 at the transverse center of the oil pan 8 is positioned deeply downwardly to allow the oil pan 8 to have a desired oil storage capacity.

Since the oil filter 9 is covered with the oil pan 8 as viewed from the front, the oil filter 9 is protected from pebbles and the like which are likely to come hurtling from the front. Even though the oil pan 8 is generally covered, leaving the bottom 83 or its side surfaces partly exposed, the oil pan 8 and the oil filter 9 are essentially protected because pebbles or the like do not hit those exposed areas at perpendicular angles.

As the oil pan mounting surface 40Bb and the oil filter mounting surface 40Bc lie flush with each other, the mounting surfaces 40Bb and 40Bc of the lower crankcase 40B can be machined in one machining process.

Figure 7:
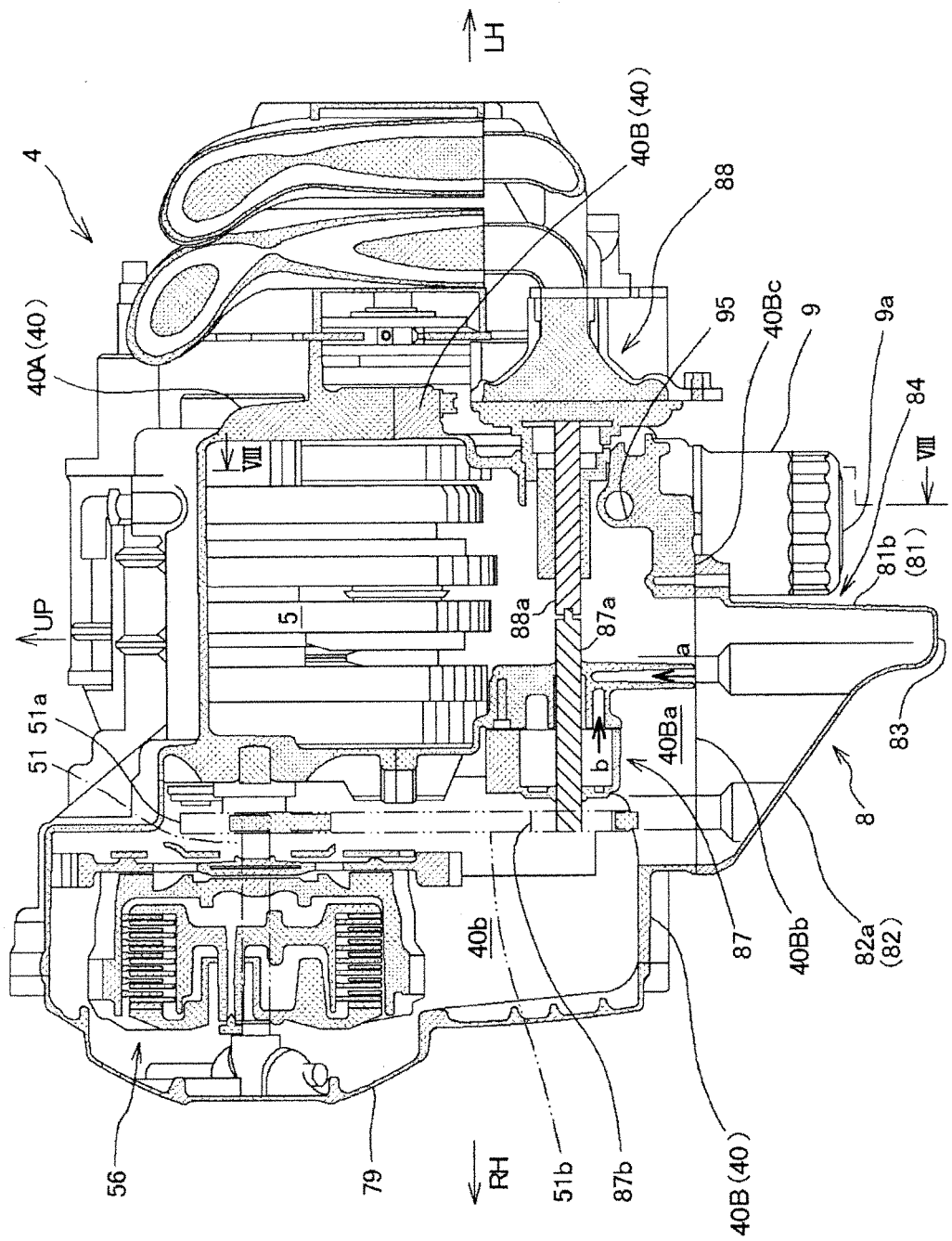
FIG. 7 is a sectional front elevational view of the internal combustion engine for the motorcycle, taken along line VII-VII of FIGS. 2 and 6.

As shown in FIG. 5, oil a in the oil pan 8 is introduced from an oil inlet pipe 85 through an oil strainer 86 into an oil pump 87 (see FIG. 7).

A rear portion of the oil pan 8 and the oil filter 9 which are indicated by the broken lines in FIG. 5 are illustrated in FIG. 7 which is a sectional front elevational view of the internal combustion engine 4, taken along line VII-VII of FIG. 2 and line VII-VII of FIG. 6.

As also shown in FIG. 7, the oil filter 9 is mounted on the bottom of the lower crank case 40B at the oil filter mounting surface 40Bc thereof which lies flush with the oil pan mounting surface 40Bb, and is surrounded by the left side wall recess region 81b of the left side wall 81 of the oil pan 8.

In FIG. 7, the oil pump 87 has an oil pump shaft 87a with a driven sprocket 87b mounted thereon. The driven sprocket 87b is operatively coupled to a pump drive sprocket 51a on the main shaft 51 by a pump drive chain 51b (see FIG. 4). When the driven sprocket 87b is rotated by the pump drive chain 51b, the oil pump 87 delivers the oil a from the oil strainer 86 shown in FIG. 5 into the oil filter 9 (see FIG. 8).

A water pump 88 has a water pump shaft 88a coaxially connected to the oil pump shaft 87a. When the water pump shaft 88a is rotated by the oil pump shaft 87a, the water pump 88 delivers cooling water to predetermined regions to be cooled.

Figure 8:
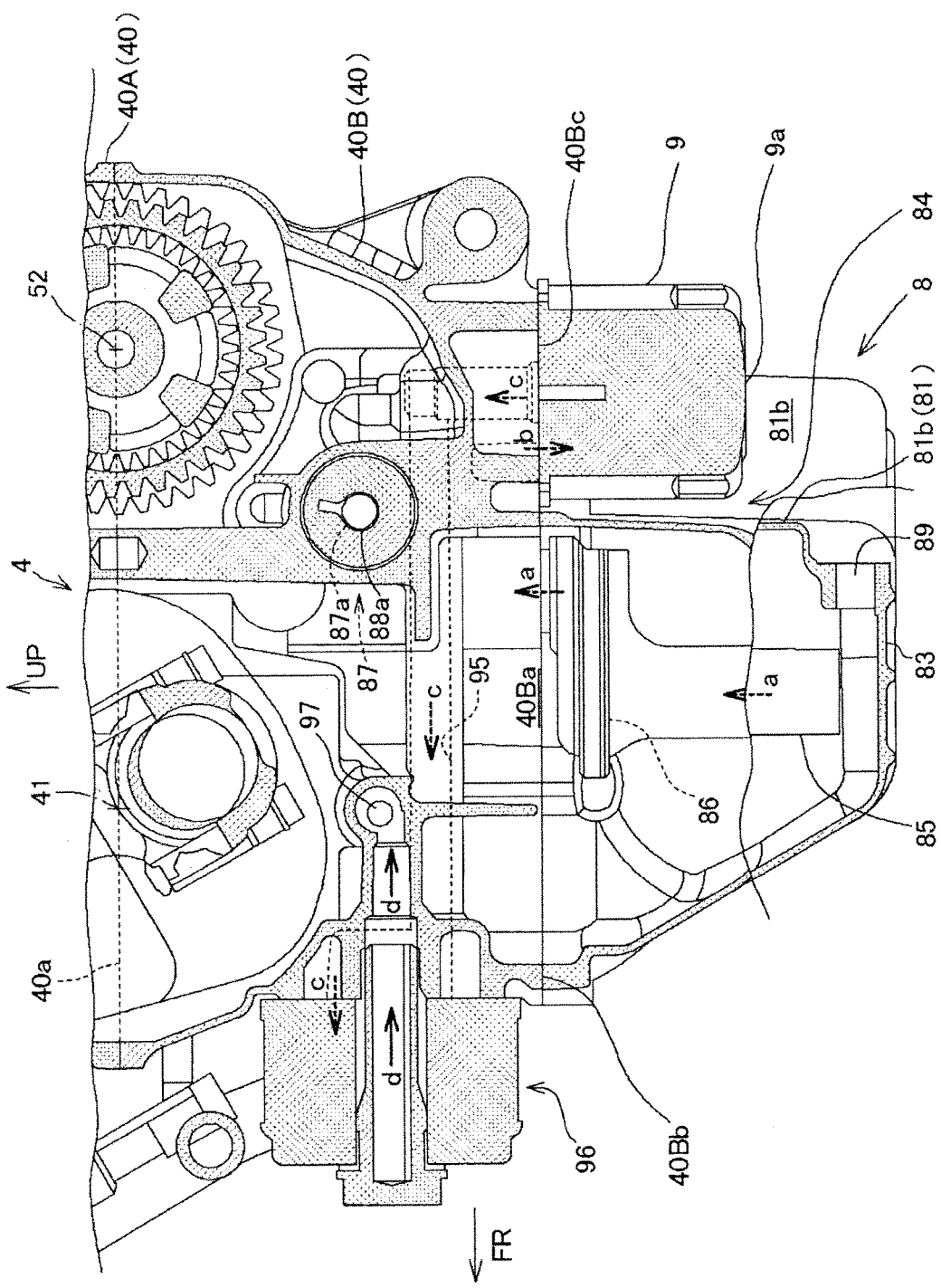
FIG. 8 is a sectional side elevational view of the internal combustion engine for the motorcycle, taken along line VIII-VIII of FIG. 7.

FIG. 8 is a sectional side elevational view taken along line VIII-VIII of FIG. 7. As shown in FIG. 8, oil b delivered from the oil pump 87 (see FIG. 7) is supplied to the oil filter 9, and purified oil c is delivered through an oil passage 95 defined in the lower crankcase 40B into a water-cooled oil cooler 96 mounted on a front portion of the lower crankcase 40B, where it is cooled.

Oil d that has left the water-cooled oil cooler 96 flows through a main gallery 97 defined in the lower crankcase 40B, from which it is supplied to various parts of the internal combustion engine 4.

As shown in FIG. 8, a drain hole 89 is defined in the left side wall recess region 81b near the bottom 83 of the oil pan 8, and is closed by a plug, not shown (also see FIG. 5).

Since the drain hole 89 is positioned below a lower end 9a of the oil filter 9, the oil filter 9 is prevented from being smeared when oil is drained from the drain hole 89.

The bottom 83 of the oil pan 8 extends downwardly beyond the lower end 9a of the oil filter 9. Consequently, when the oil filter 9 is serviced for maintenance, such as when it is installed or removed, a tool used to install or remove the oil filter 9 is blocked by the oil pan 8 against interference with the exhaust pipe 46 near the right side wall 82.

Features of the oil filter layout structure for the internal combustion engine for motorcycle according to the above embodiment will be described below.

In the internal combustion engine 4 incorporated in the motorcycle 1 wherein the exhaust pipe 46 connected to the exhaust port 66 extends beneath the internal combustion engine 4 along the rearward direction of the vehicle, the oil pan 8 is disposed below the internal combustion engine 4. The right side wall 82 of the oil pan 8 is inclined downwardly toward the transverse center of the vehicle. The exhaust pipe 46 is disposed closely to the right side wall 82, and the oil filter 9 removably mounted on the internal combustion engine 4 is disposed below the internal combustion engine 4 in overlapping relation to the oil pan 8 as viewed in side elevation, near the left side wall 81 of the oil pan 8.

Since the exhaust pipe 46 and the oil filter 9 are disposed respectively near the side walls 82 and 81 of the oil pan 8 and are separate from each other in sandwiching relation to the oil pan 8, the oil pan 8 has its bottom 83 positioned deeply downwardly out of interference with the exhaust pipe 46 and the oil filter 9 at a central position on the internal combustion engine between the exhaust pipe 46 and the oil filter 9. Therefore, the exhaust pipe 46 and other parts maintain a desired height from the ground while at the same time the oil pan 8 has a desired oil storage capacity, thereby preventing the motorcycle from reducing its ability to run over steps and also reducing its bank angle.

The oil pan 8 has the recess 84 defined in a portion of the left side wall 81 at the lower surface of the lower crankcase 40B, the recess 84 being recessed toward the transverse center of the vehicle. As the oil filter 9 is housed in the recess 84 and mounted on the bottom surface of the lower crankcase 40B, the oil filter 9 has a greater height from the ground than if the oil filter 9 is mounted on the bottom 83 of the oil pan 8.

The motorcycle 1 includes the left and right lower side covers 27L and 27R covering the internal combustion engine 4, and the oil filter 9 is disposed for vertical installation and removal through the gap 28 between the lower ends 27La and 27Ra of the left and right lower side covers 27L and 27R. With the motorcycle 1 wherein the left and right sides of the internal combustion engine 4 are covered with the lower side covers 27L and 27R, the oil filter 9 is laterally covered with the left and right lower side covers 27L and 27R, and hence remains unexposed, improving the appearance of the motorcycle 1. The oil filter 9 can be installed and removed through the lower gap 28 between the left and right lower side covers 27L and 27R. Since the oil filter 9 can be replaced without the need for dislodging the lower side covers 27L and 27R, the oil filter 9 has better maintainability.

The bottom 83 of the oil pan 8 is positioned below the lower end 9a of the oil filter 9. Therefore, when the oil filter 9 is replaced, the oil pan 8 serves as a partition wall which prevents a tool or the like used to replace the oil filter 9 from interfering with the exhaust pipe 46.

The drain hole 89 of the oil pan 8 is defined in the left side wall recess region 81b of the left side wall 81 which defines the recess 84 of the oil pan 8, and is disposed below the oil filter 9. Therefore, when oil is drained from the drain hole 89 defined in the left side wall recess region 81b of the left side wall 81 which defines the recess 84 of the oil pan 8, the oil does not splash over the oil filter 9 and hence does not smear the oil filter 9.

The left side wall 81 and the right side wall 82 of the oil pan 8 which is disposed forwardly of the oil filter 9 has the left side wall slanted region 81a and the right side wall slanted region 82a, respectively, which are inclined upwardly to the left and right from the bottom 83, and the right side wall slanted region 82a of the right side wall 82 near the exhaust pipe 46 is inclined at a smaller angle than the left side wall 81. Consequently, an increased transverse space is provided below the oil pan 8 for the installation of the exhaust pipe 46 therein to allow the motorcycle to have a desired bank angle.

Inasmuch as the lower oil filter mounting surface 40Bc of the lower crankcase 40B lies flush with the oil pan mounting surface 40Bb of the lower crankcase 40B, the mounting surfaces 40Bb and 40Bc can be machined in one machining process at the bottom of the lower crankcase 40B. Therefore, the number of machining man-hours can be reduced.

Since the oil filter 9 is disposed such that the front surface of the oil filter 9 is covered with the oil pan 8 as the internal combustion engine 4 is viewed in front elevation, the oil filter 9 is protected against hurtling pebbles or the like from the front.

Figure 9:
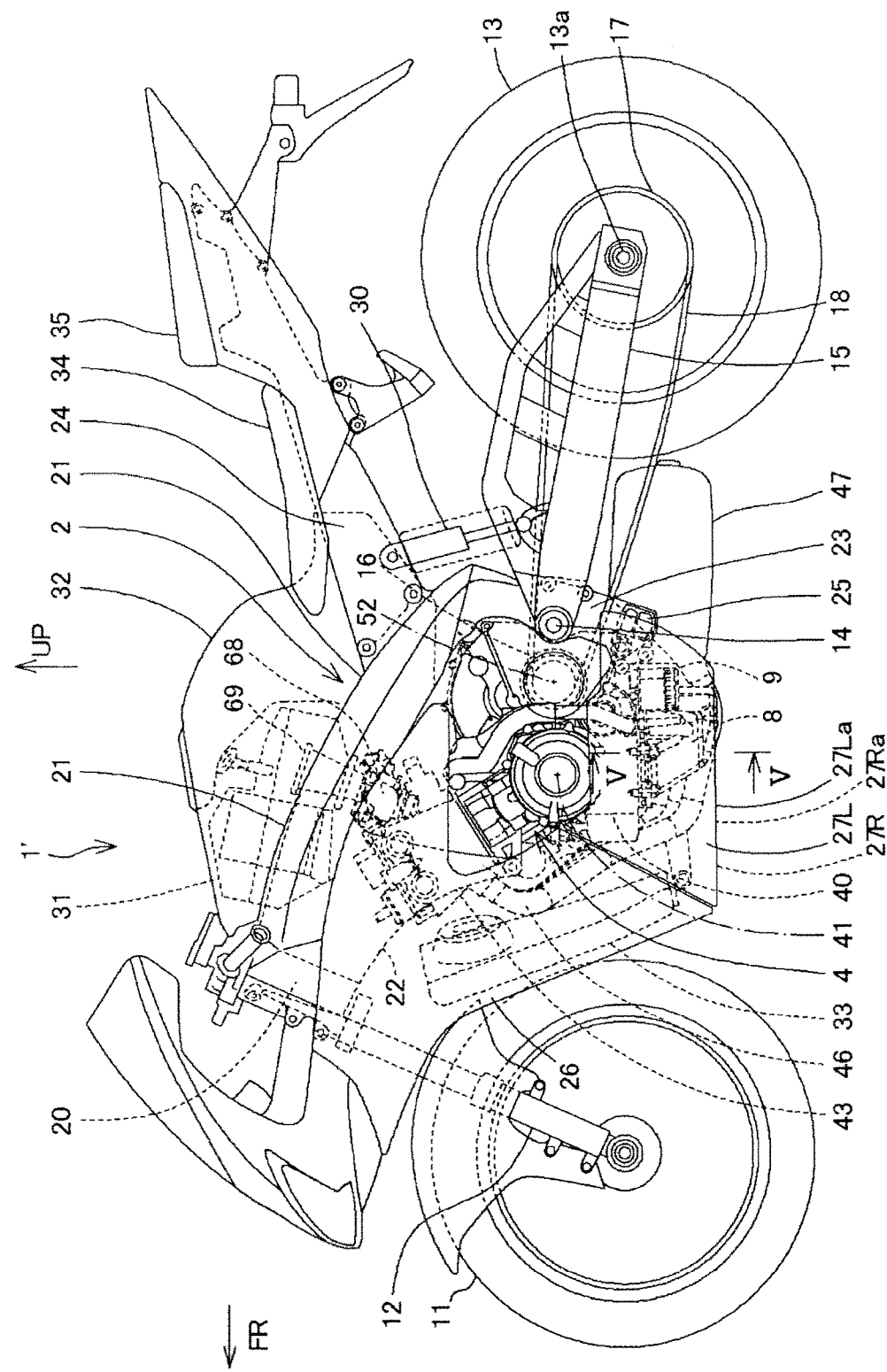
FIG. 9 is a left-hand side elevational view of a motorcycle according to a modification of embodiments of the present invention shown in FIG. 1.

A modification of the motorcycle 1 according to the present embodiment shown in FIG. 1 is illustrated in FIG. 9. According to the modification, as shown in FIG. 9, the present invention is applicable to a motorcycle 1' wherein the rear cushion unit 30 is disposed above the swing arm 15 with the exhaust muffler 47 being disposed in a space created below the rear cushion unit 30.

The oil filter layout structure for the internal combustion engine for the motorcycle according to the embodiment of the present invention has been described above. However, the present invention may include aspects different from the above embodiment within the scope of the claims.

For example, the motorcycle and the internal combustion engine according to the present invention are not limited to those illustrated in the above embodiment, but may be any of various motorcycles and internal combustion engines insofar as they fall within the scope of the claims.

The internal combustion engine is not limited to the in-line four-cylinder engine according to the above embodiment, but may have any number of cylinders. The exhaust pipe that extends below the internal combustion engine is not limited to the configuration illustrated in the embodiment.

DESCRIPTION OF REFERENCE SYMBOLS 1, 1' . . . Motorcycle, 4 . . . Internal combustion engine (internal combustion engine for motorcycle), 8 . . . Oil pan, 9 ... Oil filter, 9a ... Lower end, 27L ... Left lower side cover (left side cover of the present invention), 27La ... Lower end, 27R ... Right lower side cover (right side cover of the present invention), 27Ra ... Lower end, 28 ... Gap (gap of the present invention), 40 ... Crankcase, 40A ... Upper crankcase, 40B ... Lower crankcase, 40Bb ... Oil pan mounting surface, 40Bc ... Oil filter mounting surface, 41 ... Crankshaft, 46 ... Exhaust pipe, 51 ... Main shaft, 52 ... Countershaft (output shaft), 66 ... Exhaust port, 81 ... Left side wall (other side wall of the present invention), 81a ... Left side wall slanted region, 81b ... Left side wall recess region, 82 ... Right side wall (one side wall of the present invention), 82a ... Right side wall slanted region, 83 ... Bottom, 84 ... Recess, 89 ... Drain hole

The invention claimed is:

1. A vehicle, comprising:
an internal combustion engine;
an exhaust pipe connected to an exhaust port of the internal combustion engine, said exhaust pipe extending rearwardly beneath the internal combustion engine along a longitudinal direction of the vehicle;
an oil pan disposed below said internal combustion engine, said oil pan having one of left and right side walls spaced along a transverse direction of the vehicle, said one of the left and right side walls being inclined downwardly toward the transverse center of the vehicle, said exhaust pipe being disposed closely to the one of the left and right side walls; and
an oil filter removably mounted directly to a bottom surface of a crankcase of the internal combustion engine and disposed below said internal combustion engine in overlapping relation to said oil pan as viewed in side elevation, near another one of the left and right side walls of said oil pan, spaced along the transverse direction of the vehicle, wherein the oil filter is disposed in a recess of the oil pan, and wherein the oil filter is located above a bottom of the oil pan.

2. The vehicle according to claim 1, wherein
said oil pan has a recess defined in a portion of the another one of the left and right side walls at a lower surface of a lower crankcase, said recess being recessed toward the transverse center of the vehicle.

3. The vehicle according to claim 2,
said vehicle comprising left and right side covers covering said internal combustion engine,
wherein said oil filter is disposed for vertical installation and removal through a gap between lower ends of said left and right side covers.

4. The vehicle according to claim 3, wherein said oil pan has a bottom positioned below a lower end of said oil filter.

5. The vehicle according to claim 2, wherein said oil pan has a drain hole defined in the another one of the left and right side walls which defines said recess in said oil pan, and disposed below said oil filter.

6. The vehicle according to claim 1, wherein the side walls of said oil pan which are disposed forwardly of said oil filter have slanted regions, respectively, which are inclined upwardly to the left and the right from the bottom of said oil pan, and the slanted region of the one side wall is inclined at a smaller angle than the another one of the left and right side walls.

7. The vehicle according to claim 2, wherein said crankcase has a lower oil filter mounting surface lying flush with an oil pan mounting surface of the crankcase.

8. The vehicle according to claim 1, wherein said oil filter is disposed such that said oil filter has a front surface covered with said oil pan as the internal combustion engine is viewed in front elevation.

9. An oil filter layout structure for a vehicle, said oil filter layout structure comprising:
an oil pan disposed below an internal combustion engine, said oil pan having one of left and right side walls spaced along a transverse direction of the vehicle, said one of the left and right side walls being inclined downwardly toward a transverse center of the vehicle, and configured such that an exhaust pipe of the vehicle is disposed closely to the one of the left and right side walls; and
an oil filter removably mounted directly to a bottom surface of a crankcase of the internal combustion engine and disposed below the internal combustion engine in overlapping relation to said oil pan as viewed in side elevation, near another one of the left and right side walls of said oil pan spaced along the transverse direction of the vehicle, wherein the oil filter is disposed in a recess of the oil pan, and wherein the oil filter is located above a bottom of the oil pan.

10. The oil filter layout structure according to claim 9, wherein
said oil pan has a recess defined in a portion of the another one of the left and right side walls at a lower surface of a lower crankcase, said recess being recessed toward the transverse center of the vehicle.

11. The oil filter layout structure according to claim 10, wherein the oil filter is disposed for vertical installation and removal through a gap between lower ends of left and right side covers of the vehicle which are configured to cover the internal combustion engine.

12. The oil filter layout structure according to claim 11, wherein said oil pan has a bottom positioned below a lower end of the oil filter.

13. The oil filter layout structure according to claim 10, wherein said oil pan has a drain hole defined in the another one of the left and right side walls which defines said recess in said oil pan, and disposed below said oil filter.

14. The oil filter layout structure according to claim 9, wherein the side walls of said oil pan which are disposed forwardly of said oil filter have slanted regions, respectively, which are inclined upwardly to the left and the right from the bottom of said oil pan, and the slanted region of the one side wall is inclined at a smaller angle than the another one of the left and right side walls.

15. The oil filter layout structure according to claim 10, wherein said crankcase has a lower oil filter mounting surface lying flush with an oil pan mounting surface of the crankcase.

16. The oil filter layout structure according to claim 9, wherein said oil filter is disposed such that said oil filter has a front surface covered with said oil pan as the internal combustion engine is viewed in front elevation.

17. A vehicle, comprising:
internal combustion means for providing motive power;
exhaust pipe means for guiding exhaust gas, connected to an exhaust port of the internal combustion means, said exhaust pipe means extending rearwardly beneath the internal combustion means along a longitudinal direction of the vehicle;
oil pan means for holding oil therein disposed below said internal combustion means, said oil pan means having one of left and right side walls spaced along a transverse direction of the vehicle, said one of the left and right side walls being inclined downwardly toward the transverse center of the vehicle, said exhaust pipe means being disposed closely to the one of the left and right side walls; and oil filter means for filtering oil removably mounted directly to a bottom surface of a crankcase of the internal combustion means and disposed below said internal combustion means in overlapping relation to said oil pan means as viewed in side elevation, near another one of the left and right side walls of said oil pan means, spaced along the transverse direction of the vehicle, wherein the oil filter means are disposed in a recess of the oil pan means, and wherein the oil filter means are located above a bottom of the oil pan means.

18. The vehicle according to claim 17, wherein said oil pan means has a recess defined in a portion of the another one of the left and right side walls at a lower surface of a lower crankcase, said recess being recessed toward the transverse center of the vehicle.

19. The vehicle according to claim 18, said vehicle comprising left and right side cover means for covering said internal combustion means, wherein said oil filter means is disposed for vertical installation and removal through a gap between lower ends of said left and right side cover means.

20. The vehicle according to claim 19, wherein said oil pan means has a bottom positioned below a lower end of said oil filter means.

\* \* \* \* \*